3,014,078
SEPARATION OF CRESOL ISOMERS
Raymond N. Fleck, West Covina, and Carlyle G. Wight and Edward L. Wiseman, Fullerton, Calif., assignors to Union Oil Company of California, Los Angeles, Calif., a corporation of California
No Drawing. Filed Feb. 2, 1959, Ser. No. 790,361
16 Claims. (Cl. 260—621)

This invention relates to the separation of cresols, and in particular concerns a process for separating the isomers of cresol by selective adsorption.

The cresol isomers are in substantial demand for application in the manufacture of phenolic resins, plasticizers, inhibitors, agricultural chemicals, and ore flotation chemicals, and are also commercially important as effective germicides, antiseptics, and disinfectants. The conventional isolation of the pure components of cresol isomer mixtures is usually accomplished by processes based on the formation of selective addition compounds. These separations involve a combination of physical and chemical operations requiring expensive equipment, severe processing requirements, and extensive repetition of treating steps to produce at best poor yields of marginally pure products. Since para- and meta-cresol have substantially the same boiling points, fractional distillation is useful only in separating ortho-cresol from a mixture of the three isomers.

We have now found that the cresol isomers can be resolved by an adsorptive separation process utilizing a molecular sieve type adsorbent. More particularly, we have found that ortho-, meta-, and para-cresol can be separated from each other by a process which comprises: contacting the mixture in either the vapor or liquid phase with a lean molecular sieve adsorbent, hereinafter more fully described, to obtain a rich adsorbent containing a large proportion of the more readily adsorbed cresol isomer and an unadsorbed phase enriched in the less readily adsorbed cresol isomer; separating the rich adsorbent from the non-adsorbed phase; and treating the rich adsorbent to desorb the more readily adsorbed cresol isomer therefrom, thereby returning the adsorbent to a lean state for reuse in the next succeeding cycle of operation.

The process of the invention is generally applicable to binary and ternary mixtures of the cresol isomers. Such isomer mixtures may be obtained from coke oven distillates, petroleum, tar sand, shale oil, bone oils, wood tar, and other natural as well as synthetic sources of cresols. The crude ternary cresol isomer mixtures obtained from such sources normally contain 35–45 percent meta-cresol, 35–45 percent ortho-cresol, and 15–30 percent para-cresol. However, the process is applicable to mixtures containing any two, or all three, of the cresol isomers in widely varying proportions.

The adsorbent employed in the present process is a molecular sieve having a port size between about 7 A. and about 13 A. As a class, the molecular sieve adsorbents are crystalline partially dehydrated zeolitic metallo alumino silicates having pores of substantially uniform diameter which may vary from as small as about 3 A. to about 15 A. or greater, depending upon the identity and proportion of the component elements. It is generally considered that the adsorptive selectivity of molecular sieves is due to their containing uniform pores whose diameter is of molecular magnitude. Thus, the ability of a molecular sieve whose pore diameter is about 5 A. to separate straight-chain paraffins from branched-chain paraffins is considered to be due to the fact that the maximum molecular dimension of the straight-chain paraffins is somewhat less than 5 A., whereas that of the branched-chain paraffins is somewhat greater than 5 A. Consequently, the smaller straight-chain molecules can enter and be held in the pores of the 5 A. sieve, whereas the branched-chain molecules are too large to enter pores of such small size. In the present process, however, the adsorbent cannot operate in such manner since the pore size is greater than the minimum molecular dimension of any of the cresol isomers. On the other hand, it does not appear to operate as a conventional adsorbent. British Patent No. 777,233 clearly teaches that the molecular sieves of larger pore diameter preferentially adsorb polar, polarizable and unsaturated molecules and reject non-polar and saturated molecules. From such teachings it would be expected that there would be essentially no adsorptive preference shown for any one of the cresol isomers since the latter do not differ substantially in polarity. As is hereinafter shown, however, we have found that the present class of adsorbents exhibit substantial selectivity with respect to the cresol isomers, para-cresol being the most readily adsorbed and ortho-cresol being the least readily adsorbed.

As stated, the adsorbents which are employed in accordance with the invention are zeolitic partially dehydrated metallo alumino silicates having pores of a substantially uniform diameter between about 7 A. and about 13 A. Certain naturally occurring minerals can be heated to dehydrate the molecule and obtain an activated zeolitic adsorbent of such type. However, we greatly prefer to employ synthetic materials prepared, for example, as described in the aforesaid British patent. In general, such materials are obtained by heating suitable quantities of alumina and silica with an excess of sodium hydroxide and thereafter washing out the excess caustic to obtain a so-called "Type X" synthetic crystalline zeolitic sodium alumino silicate having the approximate molecular structure of $[6Na_2O \cdot 6Al_2O_3 \cdot 15SiO_2]$ on a water-free basis, and having substantially uniform diameter pores of about 13 A. The uniform pore diameter of this product can be altered by exchanging part of the sodium cation with other metals. For example, such product can be treated with a concentrated solution of a calcium salt, e.g., calcium chloride, at super-atmospheric pressure and at 20° C.–175° C., washed with water to remove excess calcium chloride, and thereafter partially dehydrated by heating to obtain a Type X calcium sodium alumino silicate having a pore diameter of about 10 A. and having a typical average molecular structure on a water-free basis corresponding to $$[6CaO \cdot 6Al_2O_3 \cdot 15SiO_2]_{0.9} \ [6Na_2O \cdot 6Al_2O_3 \cdot 15SiO_2]_{0.1}$$

Other cations such as magnesium, strontium, and barium may be employed instead of calcium. While any molecular sieve having a pore diameter between about 7 A. and about 13 A. may be employed in accordance with the invention, it is preferred to use the Type X 10 A. calcium sodium alumino silicate or the Type X 13 A. sodium alumino silicate referred to above. These particular products are available commercially under the trade names "Molecular Sieves 10X" and "Molecular Sieves 13X." These commercial materials may contain substantial amounts of inert binder materials.

The optimum particle size of the adsorbent will depend upon the manner in which it is used in the process, i.e., as a fixed compact bed, a fluidized bed, etc., but is usually between about 2 and about 400 mesh, preferably between about 4 and about 30 mesh for fixed and moving compact beds and between about 100 and about 300 mesh for fluidized beds.

The adsorbent is preferably employed in the form of a dense compact fixed or moving bed which is alternately contacted with the feed and then desorbed. In the simplest embodiment of the invention, the adsorbent is employed in the form of a single static bed, in which case the process is only semi-continuous. Preferably, a set of two or more static beds is employed in fixed-bed contacting with appropriate valving so that the feed stream is passed through one or more adsorbent beds while the desorption is carried out in one or more of the other beds in the set. The direction of flow during adsorption and desorption may be either up or down through the adsorbent, but preferably the adsorption is carried out in one flow direction and the desorption in the other. Any of the conventional apparatus employed in static bed fluid-solids contacting may be used. A moving compact bed of adsorbent has a much greater separation efficiency than a fixed compact bed of the same size because of the ability of the former to provide reflux. The moving compact bed is therefore preferable when an extremely high degree of separation is desired or when the feed mixture separation factor is poor.

As previously stated, the crude cresol isomer mixture is contacted with the adsorbent in either the vapor or liquid phase. The pressure is usually near atmospheric but may be either subatmospheric or superatmospheric. In general, the adsorption can be carried out at any temperature below that at which the feed components decompose but is usually effected at a temperature between about 40° C. and about 400° C., and at pressures between about atmospheric and about 1,000 p.s.i.g., preferably between 0 p.s.i.g. and 100 p.s.i.g. The immediate products of the initial adsorption stage are an unadsorbed phase which is rich in the least readily adsorbed cresol isomer in the feed mixture, and a solid adsorbent containing an adsorbate rich in the most readily adsorbed isomer. The solid and unadsorbed phases are separated, and the latter is passed to storage as the purified isomer product of the process. The rich adsorbent, on the other hand, is treated to desorb the isomer adsorbed thereon and to return it to a lean state for reuse. According to one mode of operation, such treatment merely comprises subjecting the rich adsorbent to an elevated temperature and/or reduced pressure. The use of elevated temperatures and/or reduced pressures may also be combined with the use of a stripping gas in the known manner.

In accordance with a preferred mode of operation the rich adsorbent is treated with a suitable displacement exchange fluid usually at approximately the same temperature as that employed in the initial adsorption stage. The displacement exchange fluid may be any material which is inert with respect to the adsorption of the feed mixture, is adsorbable by the adsorbent, and is readily separated from the components of the feed mixture by distillation, absorption, or other conventional means. Preferably, the displacement exchange fluid is one which has a boiling point substantially outside the boiling range of the feed mixture and has an adsorbability substantially the same as that of the adsorbed components of the feed mixture. A preferred displacement exchange fluid is phenol. Other materials which may be employed include ethers, aromatic hydrocarbons, and paraffin hydrocarbons.

The following experimental examples, in which percentages are by weight, specifically illustrate the practice of the invention.

Example I

A mixture of cresol isomers comprising 39 percent para-cresol and 61 percent meta-cresol is circulated for a period of about one hour through a lean "Molecular Sieves 13X" (zeolitic sodium alumino silicate) adsorbent bed at about 200° C. and an absolute pressure of about 480 mm. of Hg. The unadsorbed phase is found to contain about 36 percent para-cresol and about 64 percent meta-cresol. The rich adsorbent is then stripped with phenol at about 200° F. and atmospheric pressure yielding an adsorbate substantially enriched in para-cresol. Similar results are contained with a 10 A. molecular sieve.

Example II

In another run, the unadsorbed phase of Example I is reprocessed in the same manner as the original feed mixture and a correspondingly higher meta-cresol purity is obtained. The final purity of the meta-cresol-rich unadsorbed phase is about 98 percent after seven successive stages of treatment.

Example III

Another experiment, conducted in the same manner and the with same feed as Example I, except that a pressure of 60 p.s.i.g. and a temperature of about 100° C. is maintained during adsorption and stripping, yields essentially the same separation of para- and meta-cresol as found in Example I.

Example IV

A cresol mixture comprising 41 percent ortho-cresol and 59 percent meta-cresol is circulated for a period of about one hour through a lean "Molecular Sieves 13X" (zeolitic sodium alumino silicate) adsorbent bed at about 200° C. and an absolute pressure of about 350 mm. of Hg. The resulting unadsorbed phase contains about 46 percent ortho-cresol and about 54 percent meta-cresol. The rich adsorbent is then stripped with phenol at about 220° C. and atmospheric pressure yielding an adsorbate substantially enriched in meta-cresol.

Example V

In another run, a "Molecular Sieves 10X" (zeolitic calcium sodium alumino silicate) is substituted for the "Molecular Sieves 13X" (zeolitic sodium alumino silicate (in an experiment conducted in the same manner and with the same feed as Example IV. The resulting unadsorbed phase contains about 44 percent ortho-cresol and about 56 percent meta-cresol. Stripping of the rich adsorbate with naphthalene at 240° C. and atmospheric pressure yields an adsorbate substantially enriched in meta-cresol.

As will be apparent, the process of the invention essentially comprises solids-fluid contacting operations, and any of the various techniques and equipment conventionally applied to such type of operation may be adapted to the practice of the invention without departing from the scope thereof. Thus, while it is often preferred to maintain the adsorbent in the form of a moving bed, i.e., as a solids-fluid contacting operation in which a compact bed of the adsorbent is passed successively through adsorption and desorption zones where it is concurrently or countercurrently contacted with the feed stream and the displacement exchange fluid, respectively, the process is nevertheless operable when the adsorbent is maintained in the form of a fixed compact bed. Also, the solids-fluid contacting operation may be carried out employing fluidized techniques whereby the adsorbent is employed in relatively small particle size and is suspended by the flow of the fluid with which it is contacted.

Other modifications and adaptations which would occur to one skilled in this particular art are to be included in the spirit and scope of this invention as defined by the following claims.

We claim:

1. A process for separating cresol isomers which comprises: (1) contacting a fluid mixture consisting essentially of at least two of said isomers with a lean granular adsorbent consisting essentially of a partially dehydrated crystalline zeolitic metallo alumino silicate having pores of substantially uniform diameter between about 7 A. and about 13 A., said adsorbent being selective for the cresol isomers in the decreasing order, para-, meta-, and ortho-, whereby there is obtained a rich adsorbent containing an adsorbate enriched in the cresol isomer in said mixture which is most readily adsorbed by said adsorbent and a raffinate product which is enriched in the cresol isomer in said mixture which is least readily absorbed by said adsorbent; (2) separating said raffinate product from said rich adsorbent; and (3) removing the more readily adsorbed cresol isomer from said rich adsorbent.

2. A process according to claim 1 wherein said adsorbent consists essentially of a zeolitic calcium sodium alumino silicate having substantially uniform diameter pores of about 10 A.

3. A process according to claim 1 wherein said adsorbent consists essentially of a zeolitic sodium alumino silicate having substantially uniform diameter pores of about 13 A.

4. A process as defined by claim 1 wherein in Step (3), the rich adsorbent is contacted with a displacement exchange fluid, said displacement exchange fluid being inert with respect to adsorption of said isomers, being adsorbable by said adsorbent, and being readily separable from said cresol isomers, to obtain an extract product comprising the more readily adsorbed cresol isomer and said displacement exchange fluid, and said extract product is treated to separate said displacement exchange fluid therefrom.

5. A process according to claim 4 wherein said displacement exchange fluid is phenol.

6. A process for separating para-cresol from a mixture consisting essentially of para-cresol and meta-cresol, which comprises: (1) contacting said mixture with a lean granular adsorbent consisting essentially of a partially dehydrated crystalline zeolitic sodium alumino silicate having pores of substantially uniform diameter between about 7 A. and about 13 A., whereby there is obtained a rich adsorbent containing adsorbed para-cresol and a raffinate product which is rich in meta-cresol; (2) separating said raffinate product from said rich adsorbent; and (3) removing said adsorbed para-cresol from said rich adsorbent.

7. A process as defined by claim 6 wherein, in Step (3), the rich adsorbent is contacted with a displacement exchange fluid, said displacement exchange fluid being inert with respect to adsorption of said isomers, being adsorbable by said adsorbent, and being readily separable from said cresol isomers, to obtain an extract product comprising desorbed para-cresol and said displacement exchange fluid, and said extract product is treated to separate said displacement exchange fluid therefrom.

8. A process according to claim 6 wherein said adsorbent consists essentially of a zeolitic calcium sodium alumino silicate having substantially uniform diameter pores of about 10 A.

9. A process according to claim 6 wherein said adsorbent consists essentially of a zeolitic sodium alumino silicate having substantially uniform diameter pores of about 13 A.

10. A process according to claim 7 wherein said displacement exchange fluid is phenol.

11. A process according to claim 7 wherein Step (1) and Step (3) are carried out at substantially the same temperature and pressure.

12. A process for separating para-cresol from the mixture consisting essentially of para-cresol and ortho-cresol, which comprises: (1) contacting said mixture with a lean granular adsorbent consisting essentially of a partially dehydrated zeolitic sodium alumino silicate having pores of substantially uniform diameter between about 7 A. and about 13 A., whereby there is obtained a rich adsorbent containing adsorbed para-cresol and a raffinate product which is rich in ortho-cresol; (2) separating said raffinate product from said rich adsorbent; and (3) removing said adsorbed para-cresol from said rich adsorbent.

13. A process as defined by claim 12 wherein, in Step (3), the rich adsorbent is contacted with a displacement exchange fluid, said displacement exchange fluid being inert with respect to adsorption of said isomers, being adsorbable by said adsorbent, and being readily separable from said cresol isomers, to obtain an extract product comprising desorbed para-cresol and said displacement exchange fluid, and said extract product is treated to separate said displacement exchange fluid therefrom.

14. A process for separating meta-cresol from the mixture consisting essentially of meta-cresol and ortho-cresol, which comprises: (1) contacting said mixture with a lean granular adsorbent consisting essentially of a partially dehydrated crystalline zeolitic sodium alumino silicate having pores of substantially uniform diameter between about 7 A. and about 13 A., whereby there is obtained a rich adsorbent containing adsorbed meta-cresol and a raffinate product which is rich in ortho-cresol; (2) separating said raffinate product from said rich adsorbent; and (3) removing said adsorbed meta-cresol from said rich adsorbent.

15. A process as defined by claim 14 wherein, in Step (3), the rich adsorbent is contacted with a displacement exchange fluid, said displacement exchange fluid being inert with respect to adsorption of said isomers, being adsorbable by said adsorbent, and being readily separable from said cresol isomers, to obtain an extract product comprising desorbed meta-cresol and said displacement exchange fluid, and said extract product is treated to separate said displacement exchange fluid therefrom.

16. A process for separating cresol isomers which comprises: contacting a fluid mixture consisting essentially of at least two of said isomers with a solid granular adsorbent consisting essentially of a partially dehydrated crystalline zeolitic metallo alumino silicate having pores of substantially uniform diameter between about 7 A. and about 13 A., said adsorbent being selective for the cresol isomers in the decreasing order, para-, meta-, and ortho- whereby there is obtained a rich solid adsorbent and an unadsorbed fluid raffinate product; and separating said rich solid adsorbent from said unadsorbed fluid raffinate product, said fluid raffinate product being substantially leaner in said most readily adsorbed cresol isomer than said fluid mixture.

References Cited in the file of this patent
UNITED STATES PATENTS

| | | |
|---|---|---|
| 2,859,256 | Hess et al. | Nov. 4, 1958 |
| 2,882,243 | Milton | Apr. 14, 1959 |